(12) United States Patent
Chen et al.

(10) Patent No.: US 8,990,720 B2
(45) Date of Patent: Mar. 24, 2015

(54) SETTING ALERT THRESHOLDS IN THE CONTEXT OF A REAL-TIME DASHBOARD CHART

(75) Inventors: Wei Chen, Beijing (CN); Kevin M. McBride, Mountain View, CA (US); Matthew W. Novak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 11/971,430

(22) Filed: Jan. 9, 2008

(65) Prior Publication Data

US 2009/0177990 A1 Jul. 9, 2009

(51) Int. Cl.
*G06F 3/048* (2013.01)
*G06F 3/0484* (2013.01)

(52) U.S. Cl.
CPC .................................. *G06F 3/04847* (2013.01)
USPC ............................. 715/769; 715/771; 345/440

(58) Field of Classification Search
USPC ............ 345/440, 440.1, 440.2; 715/212, 230, 715/231, 232, 769, 763
See application file for complete search history.

(56) References Cited

U.S. PATENT DOCUMENTS

| | | | |
|---|---|---|---|
| 5,003,248 A | 3/1991 | Johnson | |
| 5,119,076 A | 6/1992 | Wilson | |
| 5,936,622 A | 8/1999 | Halverson et al. | |
| 5,953,009 A * | 9/1999 | Alexander | 715/771 |
| 6,356,849 B1 * | 3/2002 | Jaffe | 702/66 |
| 6,577,323 B1 * | 6/2003 | Jamieson et al. | 715/700 |
| 6,704,012 B1 | 3/2004 | Lefave | |
| 6,895,348 B2 | 5/2005 | Kawabe et al. | |
| 6,980,212 B2 | 12/2005 | Letts | |

(Continued)

OTHER PUBLICATIONS

HobbyLab, Documentation:Osclliscope , Jan. 5, 2007, Internet Archive Wayback Machine, http://web.archive.org/web/20070105072517/http://www.hobbylab.us/USBOscilloscope/Help/osc.htm.*

(Continued)

*Primary Examiner* — Matt Kim
*Assistant Examiner* — William Trapanese
(74) *Attorney, Agent, or Firm* — Yudell Isidore PLLC; Merriam Daniel

(57) ABSTRACT

A method of setting alert thresholds in the context of a real-time dashboard chart. An application program displays a graphical user interface (GUI) and dynamically updates a chart of real-time event data. The chart includes an event threshold bar displayed concurrently with the real-time event data. If the real-time event data has exceeded an event threshold value that corresponds to a position of the event threshold bar, the application program executes a pre-defined response function. If a click and drag input is received while a cursor is located over a graphically-textured handle located on an end of the event threshold bar, the application program moves the event threshold bar to a new location and updates a numerical threshold value that corresponds to the position of the event threshold bar. The numerical threshold value and a unique identification symbol are displayed in close proximity to the graphically-textured handle.

18 Claims, 4 Drawing Sheets

(56) References Cited

U.S. PATENT DOCUMENTS

| | | |
|---|---|---|
| 2002/0060701 A1* | 5/2002 | Naughton et al. ............ 345/853 |
| 2002/0113784 A1* | 8/2002 | Feilmeier et al. ............ 345/419 |
| 2003/0079160 A1* | 4/2003 | McGee et al. ................. 714/39 |
| 2003/0083760 A1 | 5/2003 | Keeley |
| 2005/0128210 A1* | 6/2005 | Berger .......................... 345/582 |
| 2006/0136838 A1* | 6/2006 | Nurmi ........................... 715/786 |
| 2006/0259401 A1* | 11/2006 | West et al. ..................... 705/37 |
| 2007/0033129 A1* | 2/2007 | Coates ....................... 705/36 R |
| 2008/0065510 A1* | 3/2008 | Yu ................................... 705/27 |

OTHER PUBLICATIONS

Gill Information Technology, Auto ShutDown XP Professional, 2005, vol. 1, http://www.gillit.com/asdxp/User%20Guide.pdf.*

IBM, Method and Apparatus for Graphical Specification of Monitoring Thresholds, IP.com Prior Art Database (www.ip.com), IP.com number: IPCOM000153285D, May 31, 2007.

IBM, Method and Apparatus for Specifying Unique Responses to Thresholds Over Time, IP.com Prior Art Database (www.ip.com), IP.com number: IPCOM000153286D, May 31, 2007.

\* cited by examiner

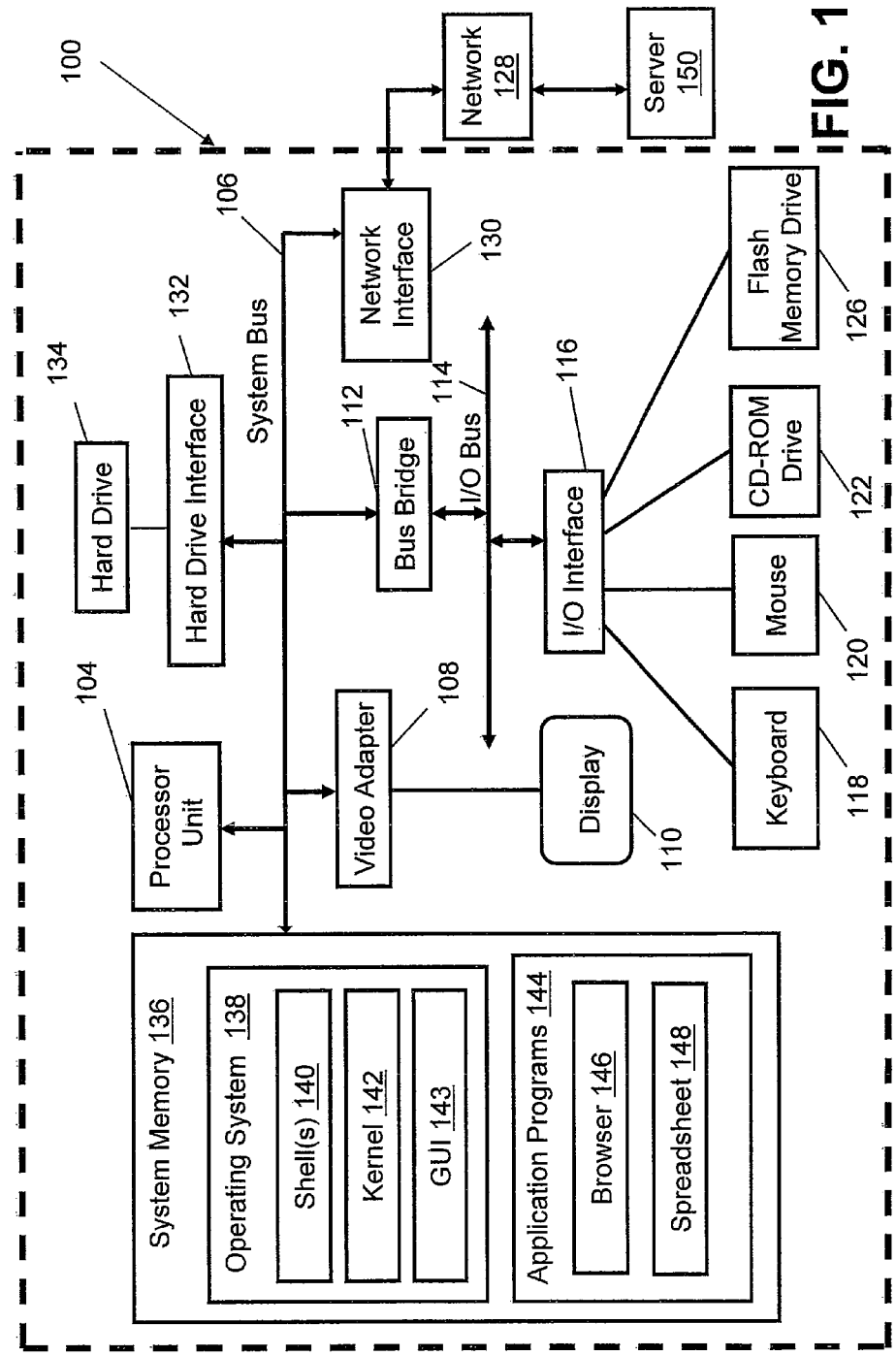

SETTING ALERT THRESHOLDS IN THE CONTEXT OF A REAL-TIME DASHBOARD CHART

BACKGROUND OF THE INVENTION

1. Technical Field

The present invention relates in general to computer application programs and in particular to graphical user interface (GUI) applications. Still more particularly, the present invention relates to an improved method and system for setting alert thresholds within a GUI in the context of a real-time dashboard chart.

2. Description of the Related Art

Computer application programs often use a graphical user interface (GUI) to provide output data to a user in a graphical format, such as a line graph or a bar graph. Application programs may also enable a user to set one or more event thresholds within a GUI. As utilized herein, an event threshold refers to a data value that defines a boundary level (e.g., a minimum or a maximum) for a set of input data. Applications typically perform one or more pre-defined functions when input data values are outside an acceptable range defined by one or more event thresholds. For example, an application may generate an email notification when a stock price rises above or falls below a specified value. Similarly, an application may perform an automated hardware shutdown when the temperature of a central processing unit (CPU) rises above a pre-defined level. Also, an application may generate a problem notification when performance metrics of a database system exceed or fall below acceptable levels.

Conventional application programs enable users to adjust (i.e., calibrate) event thresholds to local and/or normative values. However, the calibration of event thresholds typically requires extensive analysis of local data requirements over an extended period of time. Event threshold calibration can therefore be a laborious and error-prone process. Novice users are often unfamiliar with local data values and are thus unable to define meaningful event thresholds.

SUMMARY OF AN EMBODIMENT

Disclosed are a method, system, and computer program product for setting alert thresholds in the context of a real-time dashboard chart. An application program displays a graphical user interface (GUI) and dynamically updates a chart of real-time event data. The chart includes an event threshold bar displayed concurrently with the real-time event data. If the real-time event data has exceeded an event threshold value that corresponds to a position of the event threshold bar, the application program executes a pre-defined response function. If a click and drag input is received while a cursor is located over a graphically-textured handle located on an end of the event threshold bar, the application program moves the event threshold bar to a new location and updates a numerical threshold value that corresponds to the position of the event threshold bar. The numerical threshold value and a unique identification symbol are displayed in close proximity to the graphically-textured handle.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 1 depicts a high level block diagram of an exemplary computer, according to an embodiment of the present invention;

DETAILED DESCRIPTION OF AN ILLUSTRATIVE EMBODIMENT

Figure 2A:
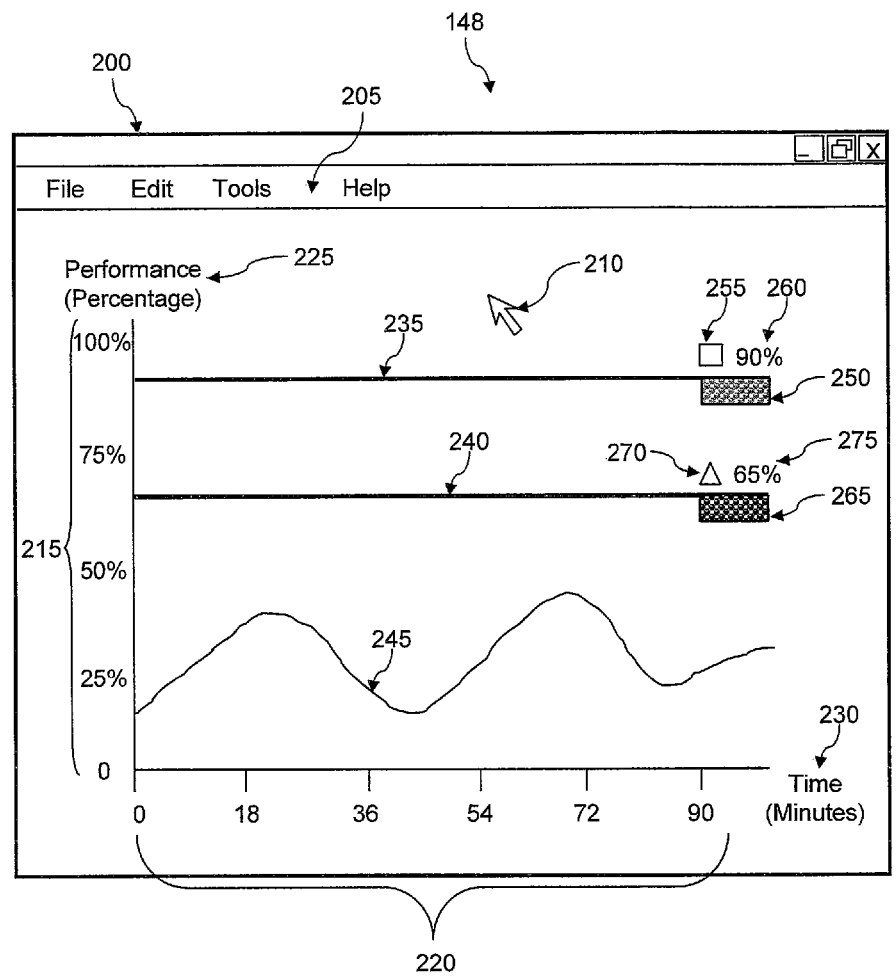
FIG. 2A illustrates a first view of an exemplary graphical user interface (GUI), according to an embodiment of the present invention.

The present invention provides a method, system, and computer program product for setting alert thresholds in the context of a real-time dashboard chart.

With reference now to FIG. 1, there is depicted a high level block diagram of an exemplary computer, according to an embodiment of the present invention. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138 and application programs 144.

OS 138 includes shell 140, for providing transparent user access to resources such as application programs 144. Generally, shell 140 (as it is called in UNIX®) is a program that provides an interpreter and an interface between the user and the operating system. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146 and spreadsheet 148. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Spreadsheet 148 performs the functions illustrated in FIG. 3, which is described below.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

With reference now to FIG. 2A, there is depicted a first view of an exemplary GUI, according to an embodiment of the present invention. As shown, spreadsheet 148 (FIG. 1) includes window 200, which may include data from system memory 136 and/or an external data source (e.g., server 150). Window 200 includes GUI 143 (FIG. 1), which includes heading field 205. Heading field 205 includes one or more pull down menus (e.g., "file", "edit", "tools", and "help") that are accessible via cursor 210 and/or hot-key combinations entered on keyboard 118. Cursor 210 is controlled by mouse 120 (FIG. 1). Window 200 also includes y-axis (i.e., vertical axis) 215 and x-axis (i.e., horizontal axis) 220, which form a chart (i.e., a graph). Y-axis 215 includes y-axis label 225, which corresponds to the units of the variable measured by y-axis 215 (e.g., performance measured as a percentage). Similarly, x-axis 220 includes x-axis label 230, which corresponds to the units of the variable measured by x-axis 220 (e.g., time measured in minutes). In another embodiment, window 200 may also include an additional third axis (i.e., a z-axis).

According to the illustrative embodiment, window 200 includes one or more event threshold bars, such as first event threshold bar 235 and second event threshold bar 240. Window 200 also includes a dynamically updated graphical line of real-time event data 245 that corresponds to an input signal received via network interface 130 or I/O interface 116. The one or more event threshold bars are displayed in the same window as real-time event data 245 (e.g., as a "dashboard chart"). First and second event threshold bars 235 and 240 are initially positioned in default locations, such that first and second event threshold bars 235 and 240 extend horizontally at one or more locations along y-axis 215. In one embodiment, the initial default locations of the event threshold bars are based on the historical minimum and/or maximum values of real-time event data 245. In another embodiment, event threshold bars may extend vertically and be initially positioned at default locations along x-axis 220.

As shown, first event threshold bar 235 includes a visually-textured "handle" 250, a unique identification symbol 255, and numerical threshold value 260, which corresponds to the position of first event threshold bar 235 relative to y-axis 215. Similarly, second event threshold bar 240 includes handle 265, identification symbol 270, and numerical threshold value 275. As utilized herein, a "handle" refers to a graphical component (e.g., a tab, box, or extension) of an event threshold line. A user of computer 100 (FIG. 1) may adjust an event threshold by using mouse 120 to position cursor 210 over a portion of the corresponding handle and subsequently "clicking and dragging" with mouse 120 to move the event threshold bar to a desired location (e.g., a location in close proximity to the current values of real-time event data 245). Real-time event data 245 thus provides a reference that enables users of spreadsheet 148 to efficiently calibrate the event threshold that corresponds to a graphical event threshold bar.

In one embodiment, unique identification symbols (255, 270) may include multiple pre-defined shapes (e.g., triangles, circles, squares, diamonds, and stars) located next to the numerical threshold value and handle at an end of each event threshold bar. Each event threshold bar and the corresponding handle may also be distinguished from other event threshold bars and/or real-time event data 245 by the use of different colors.

Figure 2B:
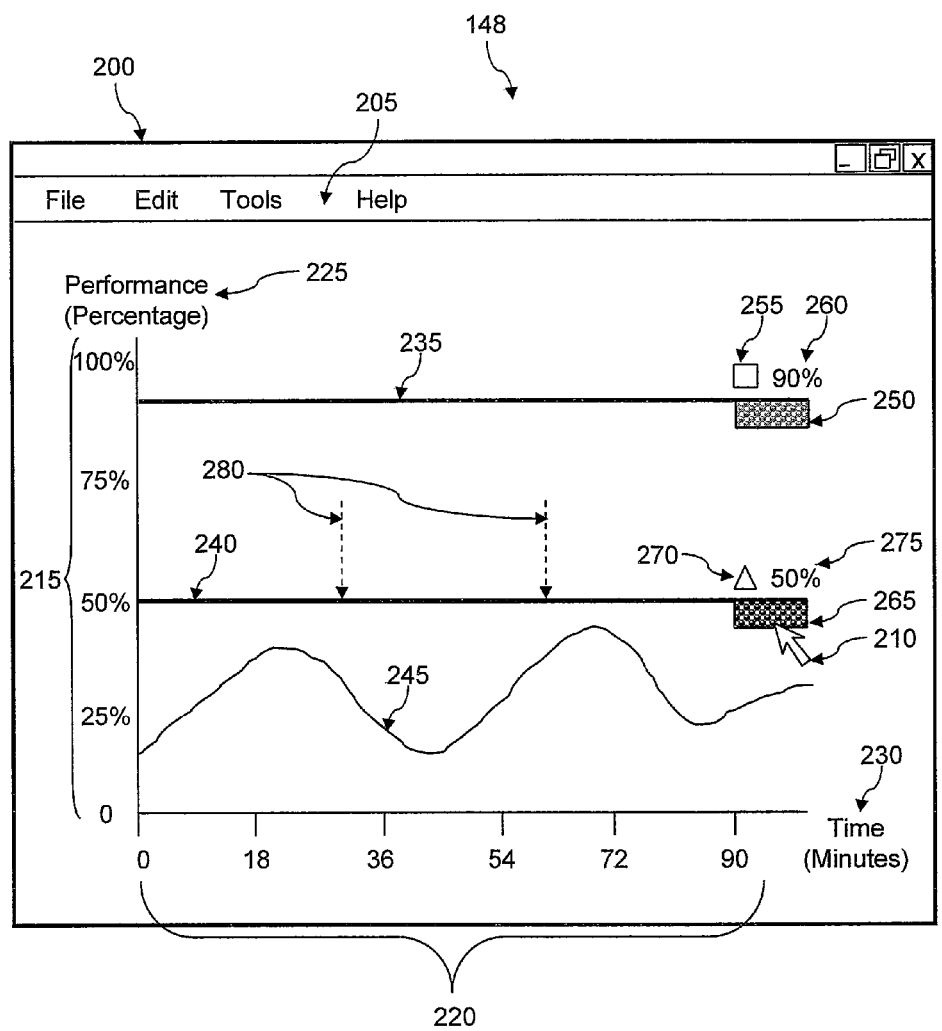
FIG. 2B illustrates a second view of the exemplary GUI of FIG. 2A, according to an embodiment of the present invention.

With reference now to FIG. 2B, there is depicted a second view of the exemplary GUI of FIG. 2A, according to an embodiment of the present invention. As shown in the second view, a user of computer 100 (FIG. 1) has clicked on handle 265 of second event threshold bar 240 and dragged second event threshold bar 240 to a new location corresponding to a value of 50% along y-axis 215. Motion lines 280 are provided for illustrative purposes only and may not be visible in window 200. The method of adjusting an event threshold bar is illustrated in FIG. 3, which is discussed below.

In another embodiment, the initial position of an event threshold bar prior to an adjustment may temporarily be marked by a visually-distinguishable (e.g., dimmed, faded, or shadowed) image of the event threshold bar that remains stationary while the original image (i.e., original color and/or brightness) of the event threshold bar moves in response to a click and drag of the corresponding handle, thereby providing a contextual point of reference to the user during threshold calibration.

Figure 3:
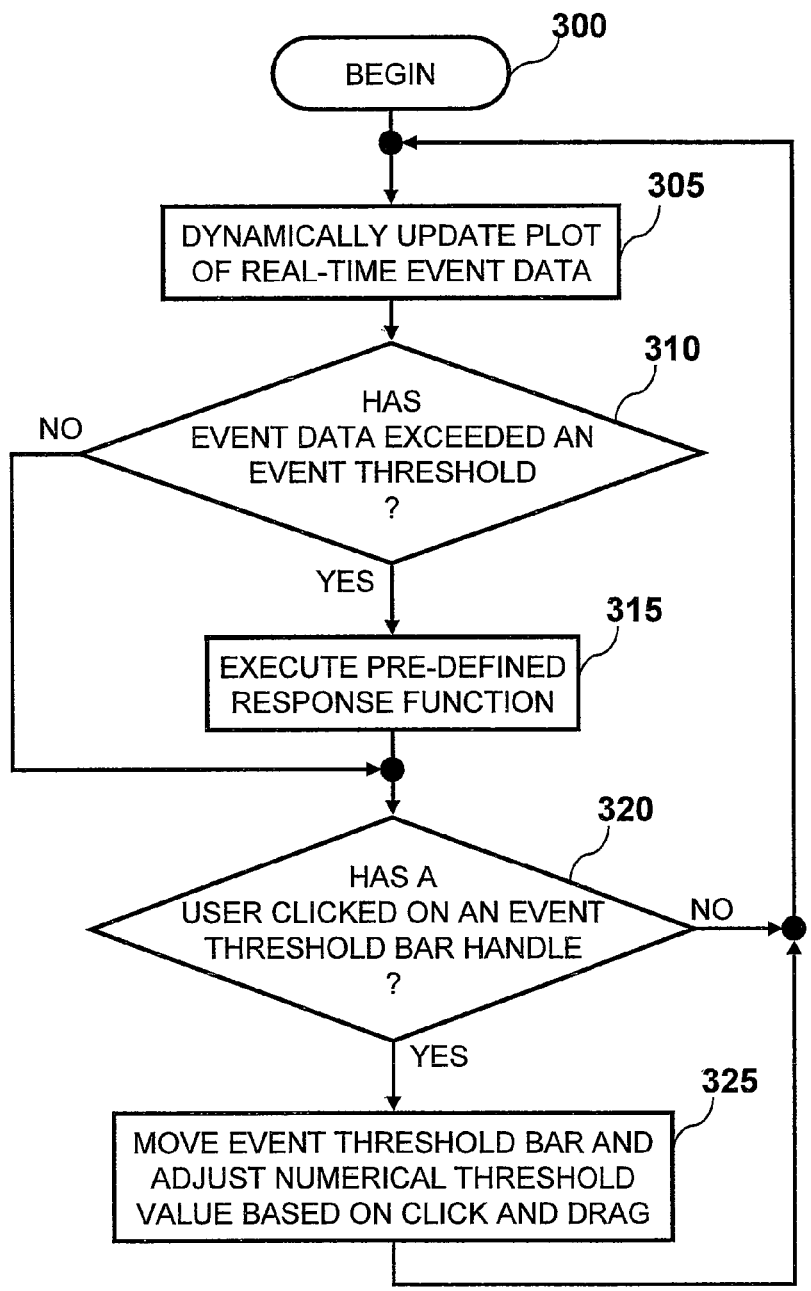
FIG. 3 is a high level logical flowchart of an exemplary method of setting alert thresholds in the context of a real-time dashboard chart, according to an embodiment of the invention.

Turning now to FIG. 3, there is illustrated a high level logical flowchart of an exemplary method of setting alert thresholds in the context of a real-time dashboard chart. The process begins at block 300 in response to one of application programs 144 (FIG. 1) generating a window that includes one or more event threshold bars. Spreadsheet 148 dynamically updates a graphical line of real-time event data 245 (FIGS. 2A-2B) in window 200, as depicted in block 305.

At block 310, the application program (e.g., spreadsheet 148) determines whether or not real-time event data 245 has exceeded an event threshold bar. If real-time event data 245 has not exceeded an event threshold bar, the process proceeds to block 320. If real-time event data 245 has exceeded an event threshold bar, the application program performs a pre-defined response function, as shown in block 315. Pre-defined response functions may include generating an email or short message service (SMS) notification, performing an automated hardware shutdown of computer 100 or a peripheral device, and/or adding an error notification to an error log stored within memory 136.

At block 320, spreadsheet 148 determines whether or not a user of computer 100 has used mouse 120 to click on a handle corresponding to an event threshold bar. If a user has not clicked on an event threshold bar handle, the process returns to block 305. If a user has clicked and dragged the handle of an event threshold bar, spreadsheet 148 moves the corresponding event threshold bar and adjusts the displayed value of the numerical threshold value while the user drags the event threshold bar, as depicted in block 325. The process subsequently returns to block 305, and spreadsheet 148 dynamically updates the chart of real-time event data 245.

The present invention thus provides a method of setting alert thresholds in the context of a real-time dashboard chart. One of application programs 144 (FIG. 1) dynamically updates a chart of real-time event data 245 (FIGS. 2A-2B). The chart includes an event threshold bar displayed concurrently with the real-time event data that provides a contextual reference, thereby enabling a user to efficiently calibrate the event threshold bar. If real-time event data 245 has exceeded an event threshold value that corresponds to a position of the event threshold bar, the application program executes a pre-defined response function. If a click and drag input is received (e.g., from mouse 120) while cursor 210 is located over a graphically-textured handle located on an end of the event threshold bar, the application program moves the event threshold bar to a new location and updates a numerical threshold value that corresponds to the position of the event threshold bar. The numerical threshold value and a unique identification symbol are displayed in close proximity to the graphically-textured handle to enable the user to easily distinguish the position of the event threshold bar.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer network with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
generating a two-dimensional chart that includes at least a first event threshold bar and a second event threshold bar, wherein an event threshold bar is a graphical line corresponding to a numerical threshold value that extends from a location along an axis of said two-dimensional chart, wherein said numerical threshold value for a particular event threshold bar corresponds to a current position of said particular event threshold bar, wherein at an end of each event threshold bar there is located a graphically textured handle and a displayed value corresponding to said numerical threshold value adjacent to said graphically textured handle, wherein said first event threshold bar is initially positioned at a first default location, and wherein said second event threshold bar is initially positioned at a second default location;
wherein:
each of said event threshold bars further comprises a unique identification symbol located next to said graphically-textured handle and said displayed value;
each unique identification symbol is a unique predefined shape from among a triangle, a circle, a square, a diamond, and a star; and
each unique identification symbol is distinguishable from any other unique identification symbols of other event threshold bars within the two-dimensional chart;
dynamically updating, within said two-dimensional chart, a graphical line of real-time event data corresponding to an input signal, wherein said first and second event threshold bars are displayed concurrently with said real-time event data in said two-dimensional chart;
in response to a click and drag input while a cursor is located over said graphically-textured handle of said first event threshold bar:
moving said first event threshold bar from an initial position to a new location; and
during said moving of said first event threshold bar, marking a point of reference within said two-dimensional chart of said initial position of said first event threshold bar, wherein said initial position is a visually distinguishable shadowed image of said first event threshold bar that remains stationary while an original image of said first event threshold bar moves within the two-dimensional chart in response to said click and drag input of said graphically-textured handle;
in response to a determination that said real-time event data has exceeded a first event threshold value that corresponds to a current position of said first event threshold bar, executing a first pre-defined response function; and
in response to a determination that said real-time event data has exceeded a second event threshold value that corresponds to a current position of a second event threshold bar, executing a second pre-defined response function.

2. The method of claim 1, further comprising:
in response to a click and drag input while a cursor is located over a graphically-textured handle located on an end of said first event threshold bar, updating said numerical threshold value.

3. The method of claim 1, wherein said first default location and said second default location are based on one or more of:
a historical minimum value of said real-time event data; and
a historical maximum value of said real-time event data.

4. The method of claim 1, wherein each pre-defined response function includes performing an automated shutdown of a computer and one or more of:
generating a short message service (SMS) notification;
performing an automated shutdown of a computer;
performing an automated shutdown of a peripheral device; and
adding an error notification to a log stored within a memory.

5. The method of claim 1, wherein said input signal is received from one of a network via a network interface or an input/output (I/O) interface.

6. The method of claim 1, wherein said initial position further comprises at least one of a dimmed image and a faded image of said first event threshold bar.

7. The method of claim 1, wherein each pre-defined response function includes performing an automated shutdown of a computer and generating an email notification.

8. A computer system comprising:
a processor unit;
a memory coupled to said processor unit; and an application program within said memory, wherein said application program displays a graphical user interface (GUI), and wherein said application program when executed on said processor unit causes said processor unit to:
generate a two-dimensional chart that includes at least a first event threshold bar and a second event threshold bar, wherein an event threshold bar is a graphical line corresponding to a numerical threshold value that extends from a location along an axis of said two-dimensional chart, wherein said numerical threshold value for a particular event threshold bar corresponds to a current position of said particular event threshold bar, wherein at an end of each event threshold bar there is located a graphically textured handle and a displayed value corresponding to said numerical threshold value adjacent to said graphically textured handle, wherein said first event threshold bar is initially positioned at a first default location, and wherein said second event threshold bar is initially positioned at a second default location;
wherein:
each of said event threshold bars further comprises a unique identification symbol located next to said graphically-textured handle and said displayed value;
each unique identification symbol is a unique pre-defined shape from among a triangle, a circle, a square, a diamond, and a star; and
each unique identification symbol is distinguishable from any other unique identification symbols of other event threshold bars within the two-dimensional chart;
dynamically update, within said two-dimensional chart, a graphical line of real-time event data corresponding to an input signal, wherein said first and second event threshold bars are displayed concurrently with said real-time event data in said two-dimensional chart;
in response to a click and drag input while a cursor is located over said graphically-textured handle of said first event threshold bar:
move said first event threshold bar from an initial position to a new location; and
during said moving of said first event threshold bar, mark a point of reference within said two-dimensional chart of said initial position of said first event threshold bar, wherein said initial position is a visually distinguishable shadowed image of said first event threshold bar that remains stationary while an original image of said first event threshold bar moves within the two-dimensional chart in response to said click and drag input of said graphically-textured handle;
in response to a determination that said real-time event data has exceeded a first event threshold value that corresponds to a current position of said first event threshold bar, execute a first pre-defined response function; and
in response to a determination that said real-time event data has exceeded a second event threshold value that corresponds to a current position of a second event threshold bar, execute a second pre-defined response function.

9. The computer system of claim 8, said application program further causes said processing unit to:
in response to a click and drag input while a cursor is located over a graphically-textured handle located on an end of said first event threshold bar, updating said numerical threshold value.

10. The computer system of claim 8, wherein said first default location and said second default location are based on one or more of:
a historical minimum value of said real-time event data; and
a historical maximum value of said real-time event data.

11. The computer system of claim 8, wherein each pre-defined response function causes the application to perform an automated shutdown of a computer and perform one or more of:
generate a short message service (SMS) notification;
perform an automated shutdown of a peripheral device; and
add an error notification to a log stored within a memory.

12. The computer system of claim 8, wherein said input signal is received from one of a network via a network interface or an input/output (I/O) interface.

13. The computer system of claim 8, wherein said initial position further comprises at least one of a dimmed image and a faded image of said first event threshold bar.

14. A computer program product comprising:
a non-transitory computer storage device; and
program code on said non-transitory computer storage device that when executed on a machine causes said machine to perform the functions of:
generating a two-dimensional chart that includes at least a first event threshold bar and a second event threshold bar, wherein an event threshold bar is a graphical line corresponding to a numerical threshold value that extends from a location along an axis of said two-dimensional chart, wherein said numerical threshold value for a particular event threshold bar corresponds to a current position of said particular event threshold bar, wherein at an end of each event threshold bar there is located a graphically textured handle and a displayed value corresponding to said numerical threshold value adjacent to said graphically textured handle, wherein said first event threshold bar is initially positioned at a first default location, and wherein said second event threshold bar is initially positioned at a second default location;
wherein:
each of said event threshold bars further comprises a unique identification symbol located next to said graphically-textured handle and said displayed value;
each unique identification symbol is a unique pre-defined shape from among a triangle, a circle, a square, a diamond, and a star; and
each unique identification symbol is distinguishable from any other unique identification symbols of other event threshold bars within the two-dimensional chart;
dynamically updating, within said two-dimensional chart, a graphical line of real-time event data corresponding to an input signal, wherein said first and second event threshold bars are displayed concurrently with said real-time event data in said two-dimensional chart;
in response to a click and drag input while a cursor is located over said graphically-textured handle of said first event threshold bar:

moving said first event threshold bar from an initial position to a new location; and during said moving of said first event threshold bar, marking a point of reference within said two-dimensional chart of said initial position of said first event threshold bar, wherein said initial position is a visually distinguishable shadowed image of said first event threshold bar that remains stationary while an original image of said first event threshold bar moves within the two-dimensional chart in response to said click and drag input of said graphically-textured handle;

in response to a determination that said real-time event data has exceeded a first event threshold value that corresponds to a current position of said first event threshold bar, executing a first pre-defined response function; and in response to a determination that said real-time event data has exceeded a second event threshold value that corresponds to a current position of a second event threshold bar, executing a second pre-defined response function.

15. The computer program product of claim 14, said program code further comprising program code that causes said machine to perform the functions of:

in response to a click and drag input while a cursor is located over a graphically-textured handle located on an end of said first event threshold bar, updating said numerical threshold value.

16. The computer program product of claim 14, wherein said first default location and said second default location are based on one or more of:

a historical minimum value of said real-time event data; and a historical maximum value of said real-time event data.

17. The computer program product of claim 14, wherein:

each pre-defined response function causes said machine to perform an automated shutdown of a computer and perform one or more of:

generating a short message service (SMS) notification;

performing an automated shutdown of a peripheral device; and adding an error notification to a log stored within a memory; and said input signal is received from one of a network via a network interface or an input/output (I/O) interface.

18. The computer program product of claim 14, wherein said initial position further comprises at least one of a dimmed image and a faded image of said first event threshold bar.

\* \* \* \* \*